Dec. 22, 1970   J. W. WISEMAN   3,549,529
METHODS AND APPARATUS FOR DISPOSING OF WASTE MATERIALS
Filed July 1, 1968
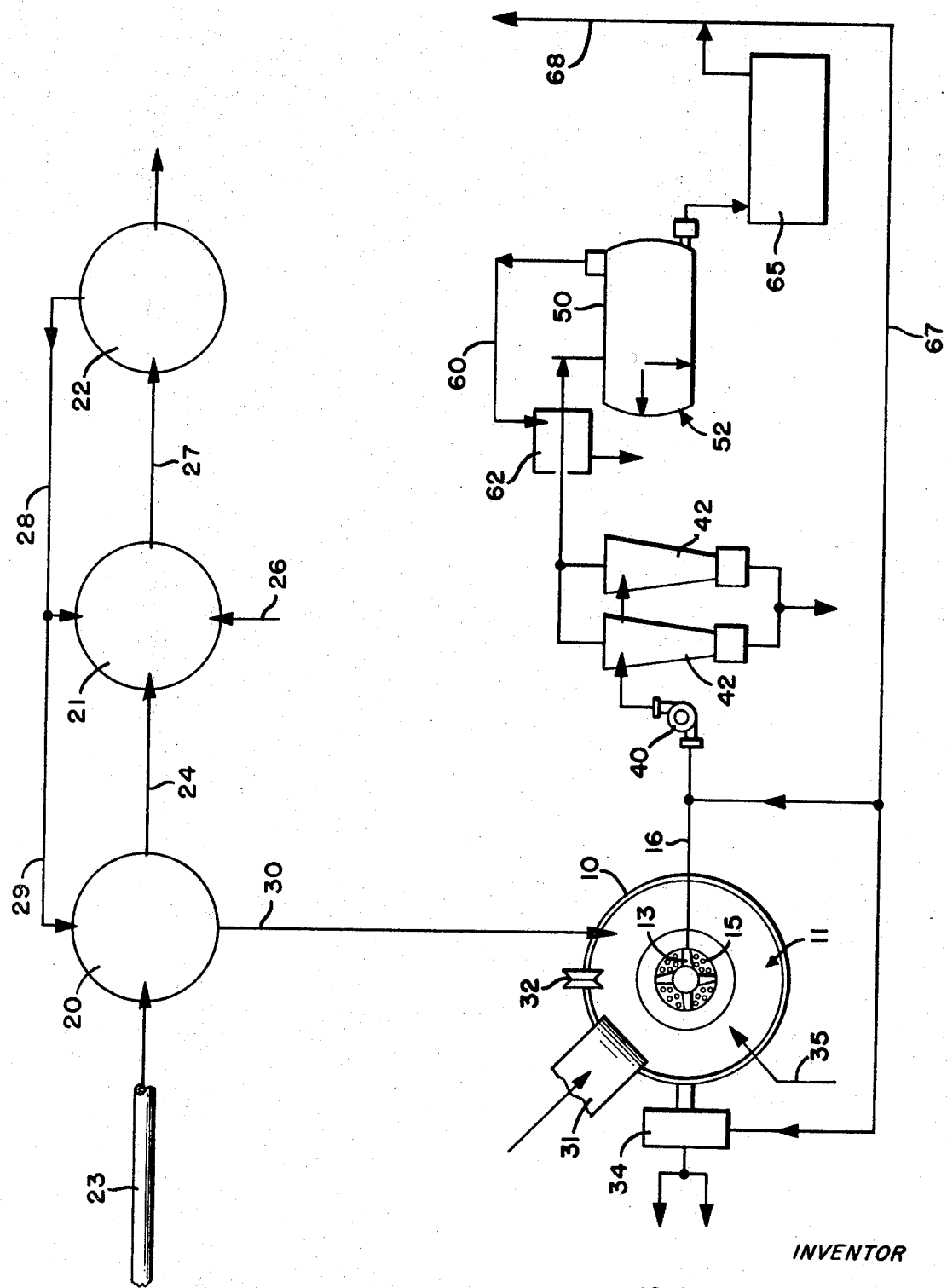
INVENTOR
JOHN W. WISEMAN
BY
Marechal, Biebel, French & Bugg
ATTORNEYS United States Patent Office 3,549,529
Patented Dec. 22, 1970

3,549,529
METHODS AND APPARATUS FOR DISPOSING OF WASTE MATERIALS
John W. Wiseman, Amelia, Ohio, assignor to The Black Clawson Company, Hamilton, Ohio, a corporation of Ohio
Filed July 1, 1968, Ser. No. 741,596
Int. Cl. B01d *21/00*
U.S. Cl. 210—63                                6 Claims

ABSTRACT OF THE DISCLOSURE

Both waste sludge, particularly sludge resulting from the treatment of municipal sewage, but also including industrial waste sludges, and ordinary garbage, trash and other municipal refuse are pulped to produce an aqueous slurry comprising particles of organic sludge and highly fibrous refuse. The solids content of the slurry is maintained within a range appropriate for ultimate disposal by aqueous state incineration in a wet oxidation reactor, and the slurry is delivered directly from the pulping device to the incinerator.

CROSS REFERENCE TO PENDING APPLICATION

Joseph Baxter, Jr., Ser. No. 719,197, filed Apr. 5, 1968.

BACKGROUND OF THE INVENTION

Waste sludges, such particularly as sewage sludge, present a disposal problem for every community. The initial treatment in most communities involves the settling of raw sewage sludge in a primary sedimentation tank, as part of an overall sanitary sewage treatment plant. Disposal of this unstable sludge presents a number of problems, not only because its odors are obnoxious, but also because its end uses are uneconomical.

In the usual practice, primary sludge is decomposed in digestion tanks where closely controlled conditions enable anaerobic digestion to take place. As much as ten to fifteen days is required for this decomposition process. The stabilized sludge is then dried on open sand beds or dewatered in mechanical thickeners for ultimate disposal either for land fill or low-grade fertilizer.

Municipal refuse, such as garbage and trash, also provides a continuing and growing disposal problem for all communities. As disclosed in the above Baxter application, the bulk of such refuse may be considerably reduced by pulping the refuse in an aqueous medium to form a pumpable slurry comprising small particles of refuse. That method and system are particularly suitable for combination with methods and applications for disposing of waste sludge, such as sewage sludge, in accordance with the present invention.

SUMMARY OF THE INVENTION

The present invention relates to a system and method for the conjoint disposal of sewage sludge and municipal refuse. The invention is principally concerned with the provision of a fast and direct method of disposal which will at the same time minimize the cost of equipment and procedures for this purpose. The invention affords outstanding economy and substantially odorless conditions for the disposal of sludges which are subject to putrefaction.

The above Baxter application discloses the use of sanitary sewage as pulper make-up medium. The present invention contemplates the use of primary sludge as the pulping medium so that both municipal refuse and primary sludge will be extracted as a pumpable slurry pursuant to the method and system disclosed by Baxter.

This extracted slurry, comprising a mixture of particles of refuse and sewage sludge, is particularly suited to incineration by a method of incineration which uses the thermal energy created by the combustion of wastes, such as the wet oxidation process, disclosed by Zimmerman, "New Waste Disposal Process," in Chemical Engineering, Aug. 25, 1958, pp. 117–120. As therein disclosed, an oxidant, such particularly as compressed air, is continuously mixed with aqueous sewage sludge flowing through a reactor operating at conditions of approximately 1000–2200 p.s.i.g. and 500–600° F. When the feed consistency is at approximately 6–7% solids, the sludge will be almost instantaneously reduced to inert ash, and its combustion will generate sufficient heat to permit a self-sustaining reaction to take place.

Sludge is thereby burned as completely with water present as if the water had been evaporated or removed by mechanical thickeners and the dried cake conventionally incinerated. If the feed consistency is lower than 6–7%, Zimmerman recommends that the feed be preheated to approximately 300° F. The steam given off by the reaction may be utilized for this purpose. Further, if the reaction is carried out under proper conditions of feed consistency, temperature, and pressure, the inert ash and other incombustibles such as sand and grit will settle rapidly to leave a clear effluent free of organic matter.

Several advantages are obtained when the wet oxidation process is used for incinerating the combined slurry extracted from the pulper according to the Baxter method. The swirling action caused by the high speed rotation of the rotor aerates the constituents in the pulper and reduces the oxygen demand of the organics therein. This reduces the amount of compressed air required in the reactor to oxidize the mixed slurry.

Further, the extracted slurry may be continuously sent from the pulper directly to the reactor without dewatering, and this operation is especially practical under the preferred practice of the invention wherein the pulping is carried out with the proportion of the sludge-containing aqueous medium controlled to maintain a relatively high consistency for the pulped slurry, namely of the order of at least 4% to 10% or more. The elimination of the dewatering step assures incineration of the slurry before putrefaction sets in and significantly reduces the cost of processing equipment. The presence of a high proportion of paper fibers in the slurry, of the order of 50% of municipal refuse (oven-dry basis), will also increase the combustibility of the extracted slurry.

The incombustible materials in the slurry, particularly grit such not only as sand and gravel but also glass, ceramics and small pieces of metal, are easily removed to a major extent by conventional cleaning equipment such particularly as centrifugal cleaners or liquid cyclones. It is in fact desirable to effect such cleaning before the slurry is introduced into the reactor in order to remove the larger gritty materials and thereby to prevent unnecessary clogging and resistance to flow. Any such gritty particles as are not removed by such cleaners will separate with the incinerated ash from the reactor effluent after passing through the reactor.

After the solids are separated from the reactor effluent, the liquid may be recycled to the pulper for the purpose of adjusting the solids consistency therein. Sterilization of this liquid is not required due to the significantly high degree of complete combustion. The residue of ash may be used for landfill. Exit reactor steam may be used to preheat the mixed slurry prior to incineration, particularly where the concentration of oxidizable materials is lower than 6–7%.

The present invention thus brings together previously separate disposal systems, one for sewage sludge and one for municipal refuse, by transforming the solid constituents of each waste material into a mutually disposable form. By utilizing the wet oxidation process for incineration, the mixed slurry may be expeditiously transferred from the pulping means to the disposal means prior to onset of organic decomposition or significant bacterial metabolism within the unstable waste constituents. The mechanical and hydraulic shearing actions of the pulper significantly retard decomposition and enhance wet oxidation by disintegrating the unstable cell walls of organic molecules under aeration conditions within an aqueous medium, comprising chiefly water.

Primary objects of the invention include the provision of a fast and direct process for the disposal of both waste sludge and municipal refuse which will enable both materials to be handled and disposed of more readily with fewer pieces of equipment. The present invention eliminates the need for decomposing raw sludge in digestion tanks for long periods of time, and drying stable sludge in large sand beds for even longer periods of time.

These and other objects and advantages will be apparent from the foregoing description and the detailed description of the preferred embodiment of the invention, taken in conjunction with the accompanying drawing and the appended claims, which follow.

BRIEF DESCRIPTION OF THE DRAWINGS

The figure is a diagrammatic plan view illustrating a complete system in accordance with and for carrying out the method of the invention.

DESCRIPTION OF PREFERRED EMBODIMENTS

In the figure, the apparatus for pulping, compacting and separating the constituents of municipal wastes are shown as comprising a pulper 10 generally of the construction disclosed in the above Baxter application and in Felton and Vokes Pat. No. 3,339,851, issued Sept. 5, 1967 to the assignee of this application. This pulper includes a tub 11 equipped with a rotor 13 mounted for rotation centrally of the bottom portion of the tub in cooperation with a perforate screen plate 15, and there is a compartment below the bottom of the tub into which the perforate screen plate 15 transmits particles which have been sufficiently reduced in size to pass through its perforations. For preferred practice of the invention, these perforations are of relatively small size, preferably of the range of ⅛ inch to one inch diameter, and the slurry passing therethrough is withdrawn from the pulper by the conduit 16.

The figure also shows schematically a standard sewage treatment plant for effecting sedimentation of sewage sludge and clarification of effluent, comprising a primary sedimentation tank 20, an aeration tank 21, and a final sedimentation tank 22, all in series. Sanitary sewage from main sewage line 23 passes through primary sedimentation tank 20 where its flow rate and detention time determine the percentage removal of solids from the influent. These solids settle to the bottom of tank 20 in the form of sewage sludge, and the effluent is delivered through line 24 to aeration tank 21.

A line 26 supplies compressed air to the liquid in aeration tank 21 in order to suppress anaerobic decomposition and to remove dissolved or suspended solids therefrom. The liquid is delivered through line 27 to the final sedimentation tank 22 where a flocculent precipitate, called activated sludge, settles out to leave a clear, odorless effluent. For proper results, some of this precipitate is recycled to tank 21 through line 28 for seeding purposes. Excess activated sludge is recycled to primary tank 20 through line 29. The clarified effluent from tank 22 may be chlorinated or otherwise chemically treated.

In present practice, the waste sludge from primary sedimentation tank 20 is transferred to an enclosed insulated tank where anaerobic digestion takes place free from contact with atmospheric oxygen. However, the process of anaerobic decomposition requires 10 to 15 days, its initial equipment cost is high, and it requires special maintenance and supervision. In accordance with the present invention, the digestion apparatus and operation are eliminated, and the sludge from tank 20 is supplied directly through line 30 to pulper 10 where it is immediately intermixed as pulping medium with the municipal refuse delivered thereto by conveyor 31.

As described in the Baxter application, the construction and operation of the pulper 10 produce maximum forces of hydraulic shear in its contents, causing defibering of the paper waste material and disintegration of other wastes, both organic and inorganic. The rotor also has a mechanical action which combines with the hydraulic action to reduce the size of non-degradable waste, such as metal cans, by striking them with such force as to have the effect of rolling them into balls, and the same action causes glass bottles and other frangible materials to be quickly broken into multiple small fragments. Other metal wastes of larger sizes are also rapidly compacted, while the vertical action in the tub causes wires and other stringy or non-fibrous sheet materials to be wound into a rope-like form for ready removal from above.

Provision is made for removing each of these two classes of solid waste from the tub 11 separately from each other and from the pulpable slurry which passes through the screen 15 into the conduit 16. The stringy materials are removed by a ragger 32 as disclosed in the Baxter application and in Cowles Pat. No. 2,340,511 issued Feb. 1, 1955. The compacted metal and other hard material of too large particle size to pass through the screen plate 15 are separated from the slurry in the tub by gravity with the aid of a continuous junk remover 34, also as described in the Baxter application.

The pulper 10 progressively reduces as much as possible of the combined refuse and sewage wastes to a slurry form, and since the paper content of average municipal wastes now approaches 50%, approximately 50% of the particles in the slurry will be fibers. The balance will comprise sludge and particles of varied nature, ranging from organic materials derived from garbage and human waste to hard particles which can generally be grouped under the heading "grit." All of this material will be delivered to the conduit 16 as soon as it is of sufficiently small particle size to pass through the perforations of screen 15.

In the preferred practice of the invention, the sludge is delivered directly to the pulper, as indicated by the line 30, to serve as at least a portion of the aqueous medium for pulping with the other wastes. Preferably this sludge will be provided at a consistency which will maintain a pulping consistency in the pulper of the order of 6%. If additional water is needed, such as for starting or wash-up purposes it may be furnished by a supply line 35 of fresh water.

The extracted slurry comprising sludge and refuse is pumped from pulper 10 by a pump 40 to suitable grit removers, shown as a plurality of liquid cyclones 42 connected in parallel for the removal of high specific gravity gritty material. The accepted material from the cyclones 42 is delivered to a reactor 50 for wet incineration. The intermediate step of grit removal is not necessarily essential to the success of the invention, but it is highly desirable, particularly for preventing clogging and resistance to flow in the reactor 50, since otherwise the reactor would be subject to an unnecessary deposit of gritty materials if they are allowed to remain in the slurry.

The invention may be readily practiced by means of a reactor constructed with side walls capable of withstanding pressures of 1000–2200 p.s.i.g. and temperatures of 500–600° F. In operation, the cold slurry is delivered directly to the wet oxidation incinerator operating under preferred conditions of approximately 1500 p.s.i.g. and 500° F. (heating and pressure generating means not shown). The solids consistency of the slurry is preferably 6–7%, and compressed air introduced into the reactor through inlet 52 is utilized as the oxidant. As disclosed in the Zimmerman article, approximately 5.14 pounds of compressed air per pound of oxidizable material will be required for complete combustion thereof. The reactor body is therefore designed with sufficient hold-up capacity for complete combustion of the constituents of the aqueous slurry.

The combustion of the slurry results in an exothermic reaction, thereby giving off sufficient heat to maintain the reaction once combustion has started. The heat of reaction will generate steam in reactor 50 which may be carried through line 60 to a heat exchanger 62 for preheating the reactor feed accepted from cyclones 42, if desired.

When complete combustion is accomplished, the aqueous effluent from reactor 50 will contain only incinerated ash and incombustible gritty material not removed by cyclones 42. Because these residues will settle rapidly, the reactor effluent may be passed through a settling tank 65 of sufficient length to produce a relatively clear aqueous material substantially free of suspended and dissolved solids. This product may be recycled without sterilization through line 67 to junk remover 34 or to line 16 for maintaining the solids consistency of the slurry, or through line 68 to be mixed with the effluent from final sedimentation tank 22 for final chlorination treatment.

While the methods and forms of apparatus herein described constitute preferred embodiments of the invention, it is to be understood that the invention is not limited to these precise methods and forms of apparatus, and that changes may be made therein without departing from the scope of the invention which is defined in the appended claims.

What is claimed is:
1. A method of treating waste material and sludge comprising:
   (a) depositing sewage sludge in a waste treatment pulper tub,
   (b) adding municipal waste including trash and garbage to maintain the consistency of said sludge and wastes within the range of 4 to 10% solids,
   (c) subjecting said sludge and wastes to comminution in said pulper tub to reduce a substantial portion of said wastes to at least a predetermined particulate size and form a slurry of said sludge and said portion of said wastes,
   (d) extracting said slurry from said tub, and
   (e) subjecting said slurry containing solids of 4 to 10% to wet oxidation reaction at approximately 500–600° F. and 1000–2200 p.s.i.g.
2. The method of claim 1 further comprising:
   (a) separating gritty materials from said slurry prior to said wet oxidation reaction thereof.
3. The method of claim 1 further comprising:
   (a) recycling effluent produced in said wet oxidation reaction to said waste treatment tub.
4. The method of claim 1 wherein:
   (a) said step of subjecting said sludge and wastes to comminution includes entrapping air therein.
5. The method of claim 1 further comprising:
   (a) preheating said slurry after extraction thereof by heat produced in said wet oxidation reaction.
6. The method of claim 1 wherein:
   (a) said consistency is maintained between 6 and 7%.

References Cited
UNITED STATES PATENTS

| | | | |
|---|---|---|---|
| 2,246,224 | 6/1941 | Streander | 210—152 |
| 2,846,072 | 8/1958 | Goetz | 210—67 |
| 3,279,603 | 10/1966 | Busse | 210—152X |

JOHN ADEE, Primary Examiner

U.S. Cl. X.R.
210—71, 73